United States Patent [19]

Thompson

[11] Patent Number: 5,719,552
[45] Date of Patent: Feb. 17, 1998

[54] AUTOMATIC TRAILER ILLUMINATING LIGHTING CONTROL SYSTEM

[76] Inventor: Jay Thompson, 33 Hevey St., Manchester, N.H. 03102

[21] Appl. No.: 518,649

[22] Filed: Aug. 24, 1995

[51] Int. Cl.$^6$ .................................................. G08B 21/00
[52] U.S. Cl. .................... 340/431; 340/686; 200/184; 200/61.04; 362/83.3
[58] Field of Search ...................... 340/321, 431, 340/686, 687, 689; 200/61.04, 61.07, 182, 184; 362/80, 83.3; 307/10.8

[56] References Cited

U.S. PATENT DOCUMENTS

| | | | |
|---|---|---|---|
| 3,821,699 | 6/1974 | Marus et al. | 340/59 |
| 3,995,251 | 11/1976 | Jones | 340/431 |
| 4,024,497 | 5/1977 | Ruppel et al. | 340/431 |
| 4,620,109 | 10/1986 | Kummer | 340/431 |
| 4,811,171 | 3/1989 | Viola | 362/32 |
| 5,097,250 | 3/1992 | Hernandez | 340/438 |
| 5,285,113 | 2/1994 | Schlich | 307/9.1 |
| 5,497,304 | 3/1996 | Caine | 362/80 |

*Primary Examiner*—Jeffery Hofsass
*Assistant Examiner*—Julie Lieu
*Attorney, Agent, or Firm*—Daniel J. Bourque; Kevin J. Carroll

[57] ABSTRACT

A system and method for illuminating an area proximate a trailer, such as a boat or snowmobile trailer. At least one area illuminating light is connected to an area illuminating lighting control member. The area illuminating lighting control member receives and interprets trailer lighting control signals for determining when to activate and deactivate the area illuminating light. Control signals include is a trailer tow vehicle "lights on" condition combined with a second trailer lighting control signal, such as a "reverse lights on" indication, or indications from a water sensor or manual switch. The area illuminating lighting control member also receives a set of trailer lighting control signals for automatically deactivating the trailer illuminating lighting, including a "running light off" indication, a "brake lights on" indication, and/or a "turn signal lights on" indication. The trailer includes trailer lighting, which may optionally be deactivated by a disabling signal from the area illuminating lighting control member based on input from a sensor such as a water sensor.

11 Claims, 6 Drawing Sheets

AUTOMATIC TRAILER ILLUMINATING LIGHTING CONTROL SYSTEM

FIELD OF THE INVENTION

This invention pertains to trailers and more particularly, to an automatic illuminating or lighting system for use on a trailer.

BACKGROUND OF THE INVENTION

Outdoor recreational activities such as boating and snowmobiling are enjoyed by an ever increasing segment of the population. To allow for a full day of outdoor activities, the boater, snowmobiler or other outdoor enthusiast often launches their recreational equipment from a trailer before daylight, or conversely retrieves the equipment with the trailer after dark. Although some large boat launches and other outdoor areas are often illuminated by artificial lights, many locations rarely provide any illumination. An outdoor enthusiast such as a boater attempting to launch or retrieve a boat in the dark at a remote location must rely upon flashlights, or headlights from other vehicles.

A boater or other outdoor enthusiast may wish to use auxiliary lights to help illuminate the trailer during launching or retrieving. This is problematic in that the boater must either permanently install auxiliary lights and a power source on the vehicle or trailer, or provide portable lighting which usually receives power from a tow vehicle's cigarette lighter or other inconvenient power source. Further, the use of auxiliary lights provides another step a boater must contend with while launching or retrieving the boat. The boater often must return to the cab of a vehicle to activate such auxiliary lighting, or locate a switch mounted somewhere else on the vehicle.

Another problem is deactivating such auxiliary lighting when the boat retrieval procedure is completed. A boater may inadvertently leave such auxiliary lighting on, which causes a drain on the battery if the vehicle's engine is not running and also may impair the vision of another vehicle driver following behind the trailer with its auxiliary lighting on.

A further problem occurs when a boat trailer's lighting system, which provides lights for a trailer's running and brake lights, remains active when a trailer is backed into the water to retrieve the boat. This can cause short circuits, wherein the water contacts across a lamp's terminals and causes excessive current drain, and may also result in broken bulbs due to cold water contacting a hot bulb. Further, leaving lights on results in battery current drain to keep the trailer lights active when they are not needed. This battery current could be used to provide more power to auxiliary lights during their use.

Accordingly, what is needed is an automatic illuminating system for use on a trailer which will automatically provide illuminating lighting when necessary, and automatically deactivate the illuminating lighting when no longer needed.

SUMMARY OF THE INVENTION

A system and method is provided for illuminating an area proximate a trailer, such as a boat trailer or snowmobile trailer or other recreational vehicle trailer. At least one area illuminating light is coupled to an area illuminating lighting control member. The area illuminating light is responsive to one or more area illuminating lighting enabling or control signals, for providing illumination proximate the area of the trailer.

The area illuminating lighting control member receives and interprets a plurality of trailer lighting control signals, at least one of which is a trailer tow vehicle "lights on" condition. The area illuminating lighting control member also receives at least a second trailer lighting control signal indicating a trailer tow vehicle first predetermined condition signal, and at least a third trailer lighting control signal indicating a trailer tow vehicle second predetermined condition signal.

The area illuminating lighting control member is responsive to the second trailer lighting control signal for energizing the area illuminating lighting enabling signal, and responsive to the third trailer lighting control signal for de-energizing the area illuminating lighting enabling signal. The area illuminating lighting control member may also be responsive to at least one sensor signal, which may originate from a water sensor. It may also be responsive to a user activated signal from a manual switch.

The trailer tow vehicle first predetermined condition signal preferably includes a trailer tow vehicle "reverse lights on" indication, while the trailer tow vehicle second predetermined condition signal preferably includes at least one of a trailer tow vehicle "reverse lights on" indication, a trailer tow vehicle "brake lights on" indication, and a trailer tow vehicle "turn signal lights on" indication.

The trailer can include trailer lighting, which may be deactivated by a disabling signal from the water sensor.

DETAILED DESCRIPTION OF THE INVENTION

Figure 1:
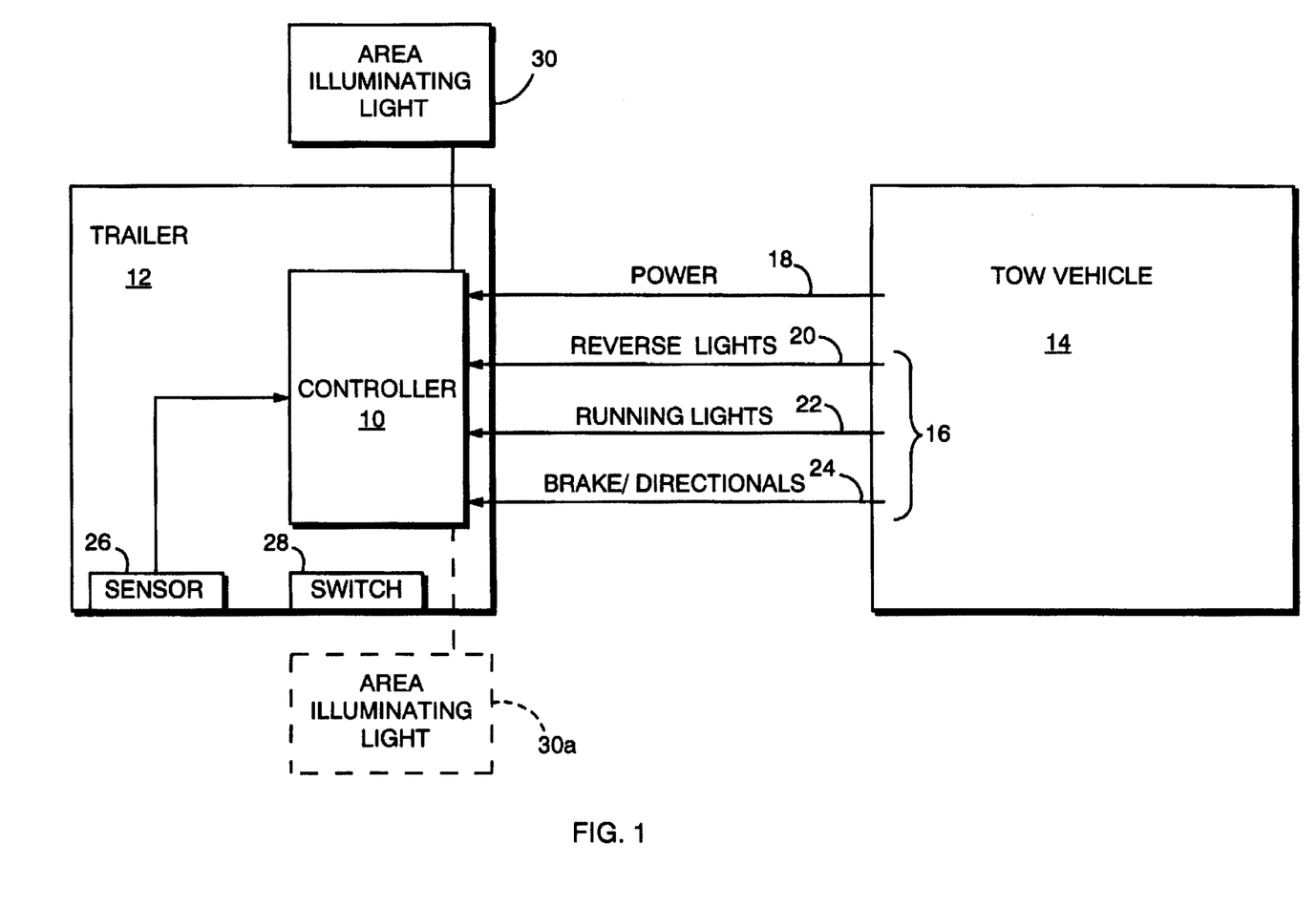
FIG. 1 is a block diagram of the automatic trailer illuminating lighting control system according to the present invention.

The present invention features an area illuminating lighting control member 10, FIG. 1 which automatically activates one or more area illuminating lighting 30, 30a for illuminating an area on and around a trailer 12. Area illuminating lighting control member 10 is responsive to various signals or indications 16, at least some of which come from a tow vehicle 14 to which trailer 12 is attached. The trailer tow vehicle indications 16 may include an indication that reverse lights are activated 20, an indication that running lights are activated 22, and an indication that brake/directional lights are activated 24. Area illuminating lighting control member 10 also receives power 18 from the tow vehicle 14.

Area illuminating lighting control member 10 is also responsive to indications from a sensor 26, such as a water sensor, and manual switch 28. Manual switch 28 provides an indication that a user wishes to activate area illuminating lighting 30 irrespective of trailer tow vehicle indications 16. Area illuminating lighting control member 10 will, upon interpreting the received indications 16, 26 28, activate at least one area illuminating light 30, for illuminating the area on and proximate the trailer 12.

The main feature of area illuminating lighting control member 10 is to automatically activate area illuminating light 30 at appropriate times, such as when recreational vehicles are being loaded or unloaded from the trailer 12 in darkness. Once the user has completed loading or unloading trailer 12, area illuminating lighting control member 10 will automatically deactivate area illuminating light 30 when tow vehicle 14 is ready for traveling, as will be explained below.

Figure 2:
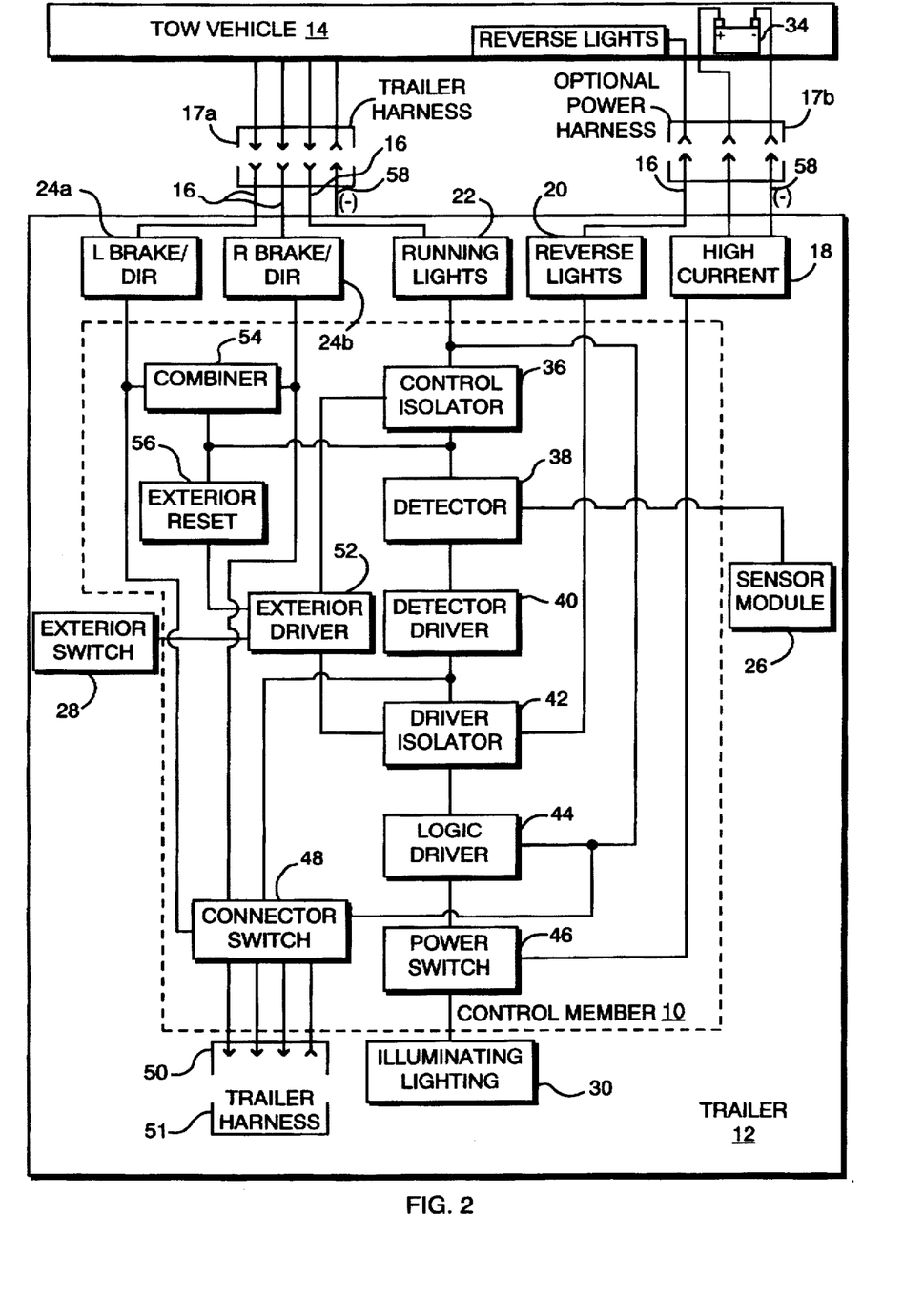
FIG. 2 is a block diagram of an area illuminating lighting control member according to the present invention.

Area illuminating lighting control member 10, FIG. 2 receives one or more trailer tow vehicle indications 16 from trailer harness 17 coupled to trailer tow vehicle 14. Trailer harness 17 is typically a standard four (4) wire trailer light harness for providing lighting for road lights on a trailer.

The trailer lighting control signals 16 include left brake/directional 24a, right brake/directional 24b, and running lights 22. A ground connection 58 is generally also provided. Area illuminating lighting control member 10 uses additional trailer lighting control signals including reverse light indication 20 and optionally a source of high current power 18. These may be available on an optional power harness 17b, which provide an indication of reverse lights and an optional high current connection from a battery 24 in the tow vehicle 14.

Area illuminating lighting control member 10 contains circuitry to respond to the various indications 16 to determine when to activate and deactivate illuminating lighting 30. The running lights signal 22 is input into a control isolator 36. Control Isolator 36 prevents the running lights of vehicle 14 from coming on when the brake lights or signal lights are activated during daytime. The output of control isolator 36 is coupled to detector 38. Detector 38 also receives input from sensor module 26 and combiner 54. In the preferred embodiment, sensor module 26 is a water sensor, for the purpose of detecting when the trailer 12 is in contact with water which will occur in a boat trailer when the trailer 12 is backed down a boat ramp and enters the water.

The input from combiner 54 provides power to detector 38, to allow control member 10 to deactivate trailer lighting when necessary, during daylight hours, when power from the running lights 22 signal is not available.

The output of detector 38 is provided as input to detector driver 40, which converts the indication from the sensor module 26 and the control isolator 36 into a power driving signal. The output signal from detector driver 40 is provided to two locations, a connector switch 48 and a driver isolator 42.

Connector switch 48 receives the indication signals of left brake/directional 24a, right brake/directional 24b and running lights 22 from trailer harness 17. These standard trailer harness signals are used to control the standard trailer lights on a trailer 12 for providing vehicle signals while the trailer 12 is in traffic. The signals pass through connector switch 48 to trailer harness 50 which is similar to the trailer harness connector 17a. When area illuminating lighting control member 10 is installed on a trailer 12 or trailer tow vehicle 14, it connects between the standard tow vehicle trailer harness 17a and the standard trailer connecting harness 51. This allows area illuminating control member 10 to be connected in series with standard trailer wire harness connectors.

Placing area illuminating lighting control member 10 allows connector switch 48 to disconnect power to trailer harness connector 50 when water is sensed by a sensor module 26. The ability to temporarily disconnect power to trailer lights provides several benefits, including preventing any electrical power to the trailer lighting system from being active while trailer 12 is immersed in water for launching or retrieving a boat which in turn can prevent any short circuits and/or damaged electrical systems such as broken light bulbs when hot light bulbs come in contact with water. Another advantage is that by temporarily disconnecting power to the trailer harness, more electrical power is available for area illuminating lighting 30.

Driver isolator 42 receives output from detector driver 40 and also receives input from reverse lights indication 20, and exterior driver 52. Driver isolator 42 isolates the various indication and detection circuits from each other. The output from driver isolator 42 is input to logic driver 44, which also receives input from running lights indication 22. Logic driver 44 uses these input signals to determine when to energize power switch 46. Power switch 46 connects optional high current 18 to illuminating lighting 30.

Other control signals including the left brake/directional signal 24a and right brake/directional signal 24b are monitored by area illuminating lighting control member 10. Those two signals are combined by combiner 54, which provides an indication when either signals 24a, 24b are present. The output of combiner 54 is input to detector 38 and exterior reset 56. If a user wishes to manually activate the illuminating lighting 30, the user may press exterior switch 28. This will signal exterior driver 52 to signal driver isolator 42 to activate the illuminating lighting 30.

Once the illuminating lighting 30 has been activated, the area illuminating lighting control member 10 must determine when to deactivate illuminating lighting 30. One such indication is when either the left brake/directional signal 24a or right brake/directional signal 24b has been activated. When this occurs, combiner 54 will signal exterior reset 56, which will then signal exterior driver 52 to deactivate the enabling signal produced by exterior switch 28.

Figure 3:
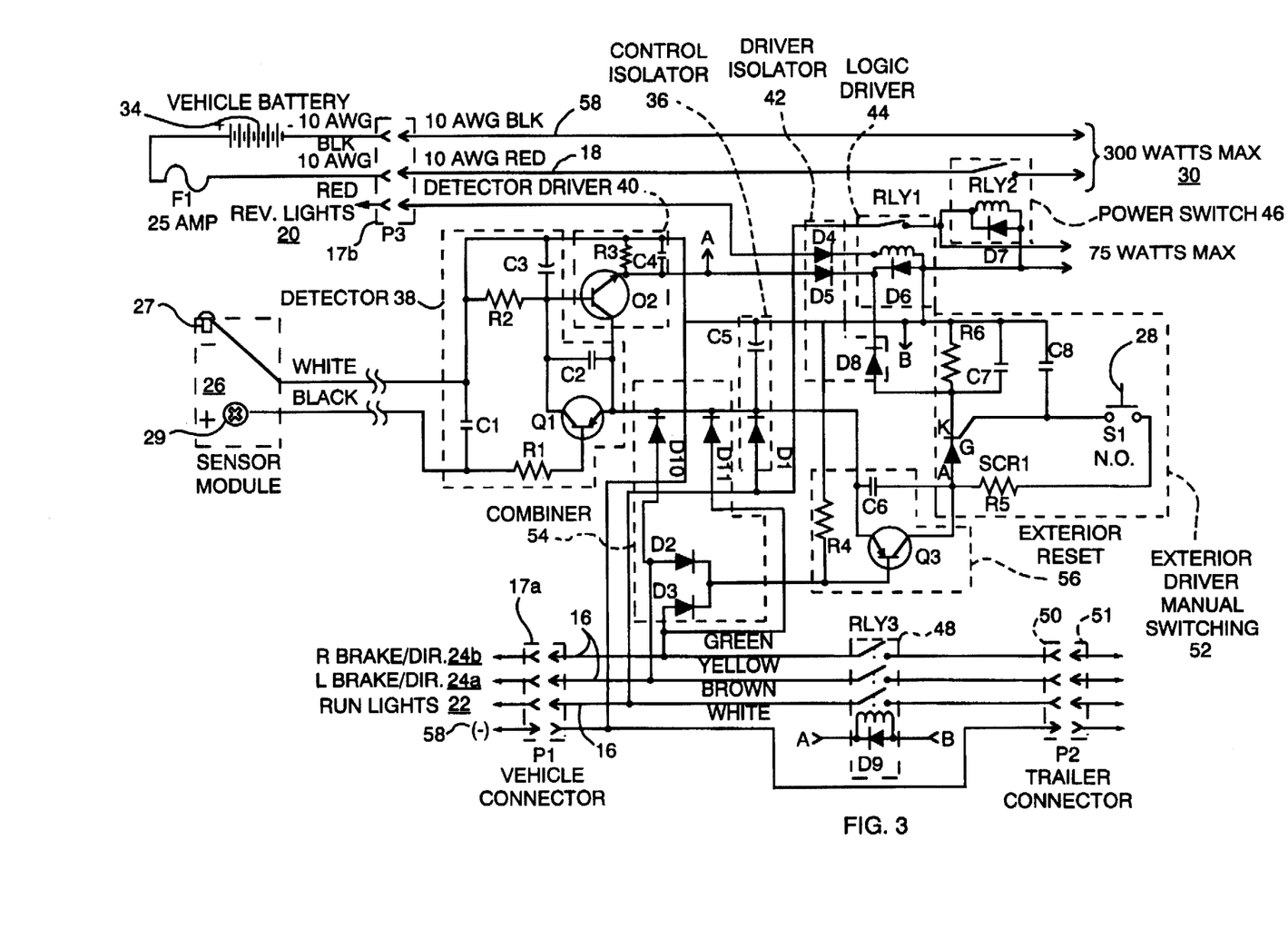
FIG. 3 is a schematic of the area illuminating lighting control member as shown in FIG. 2.

A schematic for one circuit performing the functions of area illuminating controller member 10 is shown in FIG. 3. Sensor module 26 is a water sensor which in the preferred embodiment is a pair of exposed terminals 27,29 for conducting current when the terminals are immersed in water. Optional power harness 17b provides high current power from a vehicle battery 34 or other current source to be connected through power switch 46 to illuminating lighting 30. Although a vehicle battery power source is shown, another current source with a different voltage, even including 110 volt AC power may be switched through power switch 46 to illuminating lighting 30. The invention, therefore, is not limited to supplying 12 volt vehicle power only.

Figure 4:
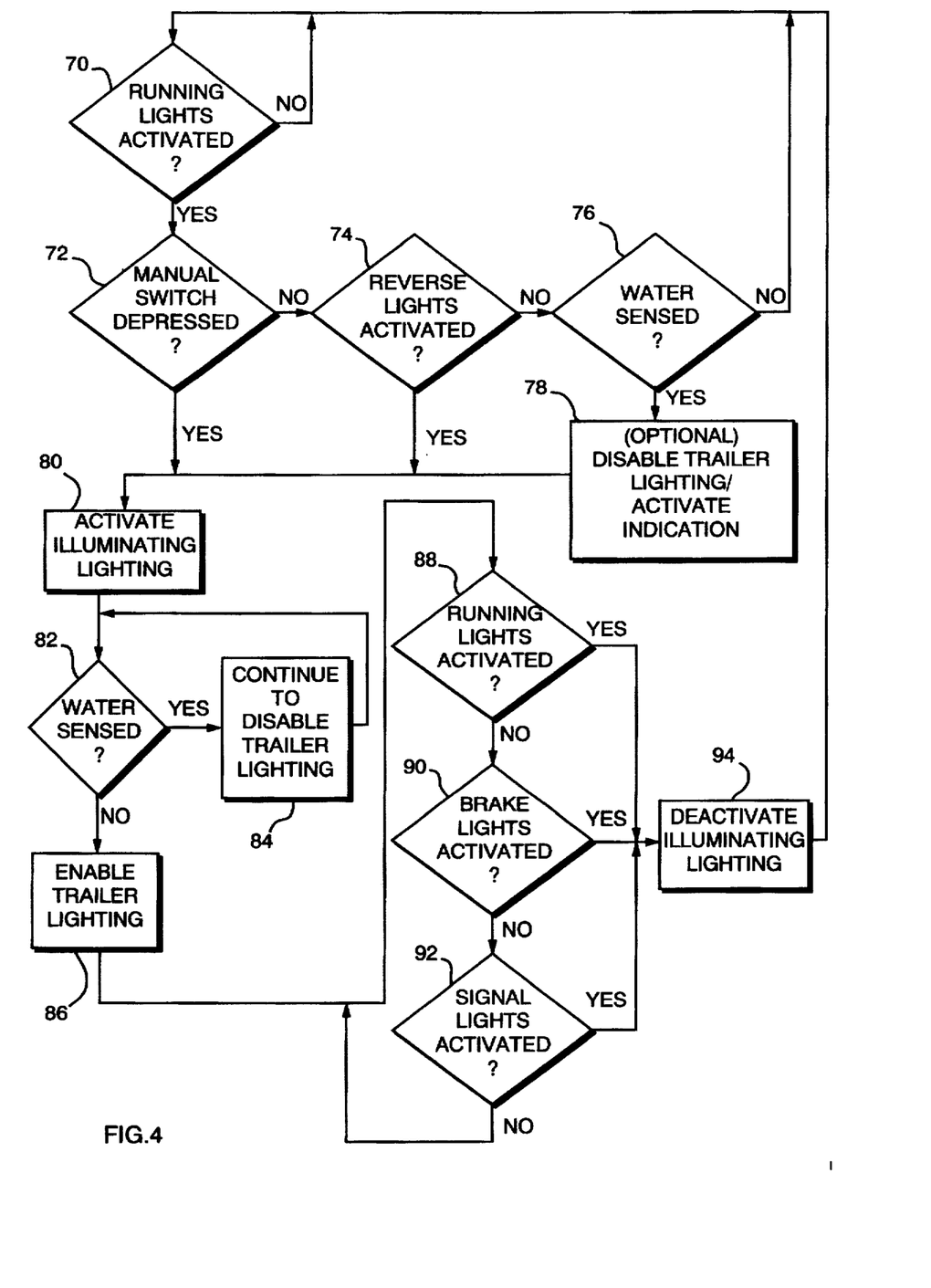
FIG. 4 is a flow chart showing the steps performed by the area illuminating lighting control member shown in FIG. 3.

The steps performed by area lighting controlling member 10 for determining when to activate and deactivate the illuminating lighting commences with detecting when a tow vehicle's 14 running lights are activated, running lights "on", step 70 FIG. 4. If the running lights are activated, the controller next determines whether the manual exterior switch 28 has been depressed, step 72. If the exterior switch 28 has not been depressed it is determined whether the reverse lights have been activated step 74 by detecting the reverse lights indication 20, FIG. 1. If there is no detection of reverse lights activated, it is determined whether water has been sensed by sensor module 26, step 76. Should this condition not occur either, processing will continue back as long as the running lights remain activated at step 70.

Should any of the steps performed by steps 72, 74 or 76 reveal a positive indication, the area illuminating lighting will be activated, step 80. In the case of water being sensed, step 76, the trailer lighting may optionally be disabled, step 78, thereby preventing any danger of electrical damage as previously described. A visual or audio signaling device (not shown) may also be activated at step 78, thereby alerting the vehicle driver that the trailer 12 is submerged.

Once the area illuminating lighting has been activated, step 80, the illuminating lighting will remain activated until a predetermined set of conditions occur. First, if water is sensed by sensor module 26, step 82, the trailer lighting will be disabled at this time, step 84. This is a separate test from the previous water sensing step 76 and trailer lighting disabling 78. Since manually activating the switch, step 72 or activating a vehicle's reverse lights 74 will also activate illuminating lighting, step 80, it is necessary to keep monitoring for water, step 82 in case a boat trailer is backed into water after the step of activating illuminating lighting, step 80.

If at step 82 water is not sensed (in the case of non-boat trailers, for example) or if water is no longer sensed, the next step is to enable trailer lighting 86. Obviously this step is not necessary if the trailer lighting was never disabled.

If water is no longer sensed by sensor module 26, step 82, the next step is to determine one of several conditions which would indicate when to automatically deactivate the illuminating lighting, step 94. The first condition is whether the running lights are deactivated, step 88. Deactivating running lights remove power to the controller 10 and provides an indication that the area illuminating lighting 30 is no longer necessary. If the running lights are activated, either of an indication that the brake lights have been activated, step 90, or an indication that the signal lights have been activated, step 92, will deactivate the illuminating lighting, step 94. The illuminating lighting will remain activated until one of the conditions in step 88, 90, or 92 are detected.

At this point the system is reset to step 70, ready to activate the illuminating lighting and deactivate the trailer lighting as needed.

As an example of the usefulness of this invention, assume a boater drives up to an unlit boat ramp after dark. The running lights on the trailer tow vehicle are activated, and as the boater prepares to back the trailer down the ramp, he puts the trailer tow vehicle into reverse. The area illuminating lighting controller member 10 will then automatically activate the illuminating lighting around the boat trailer since the running lights are activated and the trailer tow vehicle reverse lights are activated, thus allowing the boater to easily see as he backs down the ramp. As the trailer enters the water, area illuminating lighting control member 10 can optionally deactivate the trailer lighting, preventing any electrical problems. The boater can then retrieve or launch the boat.

When the trailer tow vehicle is driven up the ramp, pulling the trailer out of the water, the trailer lighting will reactivate once the water sensor no longer senses water. The boater may then perform various necessities, such as tying down the boat or loose equipment, whereupon he gets back into his vehicle, steps on the brakes and the illuminating lighting is automatically deactivated. At no point is any effort required by the boater to activate or deactivate lighting.

When the boater reaches his home, he may activate the illuminating lighting by pressing the manual switch which will reactivate lighting until the running lights on the vehicle are deactivated.

Although the steps set out in FIG. 4 describes one procedure for determining when to activate and deactivate illuminating lighting, this invention is not limited to those steps. There may be other procedures for monitoring indications from the lighting system of a trailer tow vehicle for determining when to activate and deactivate illuminating lighting.

Figure 5:
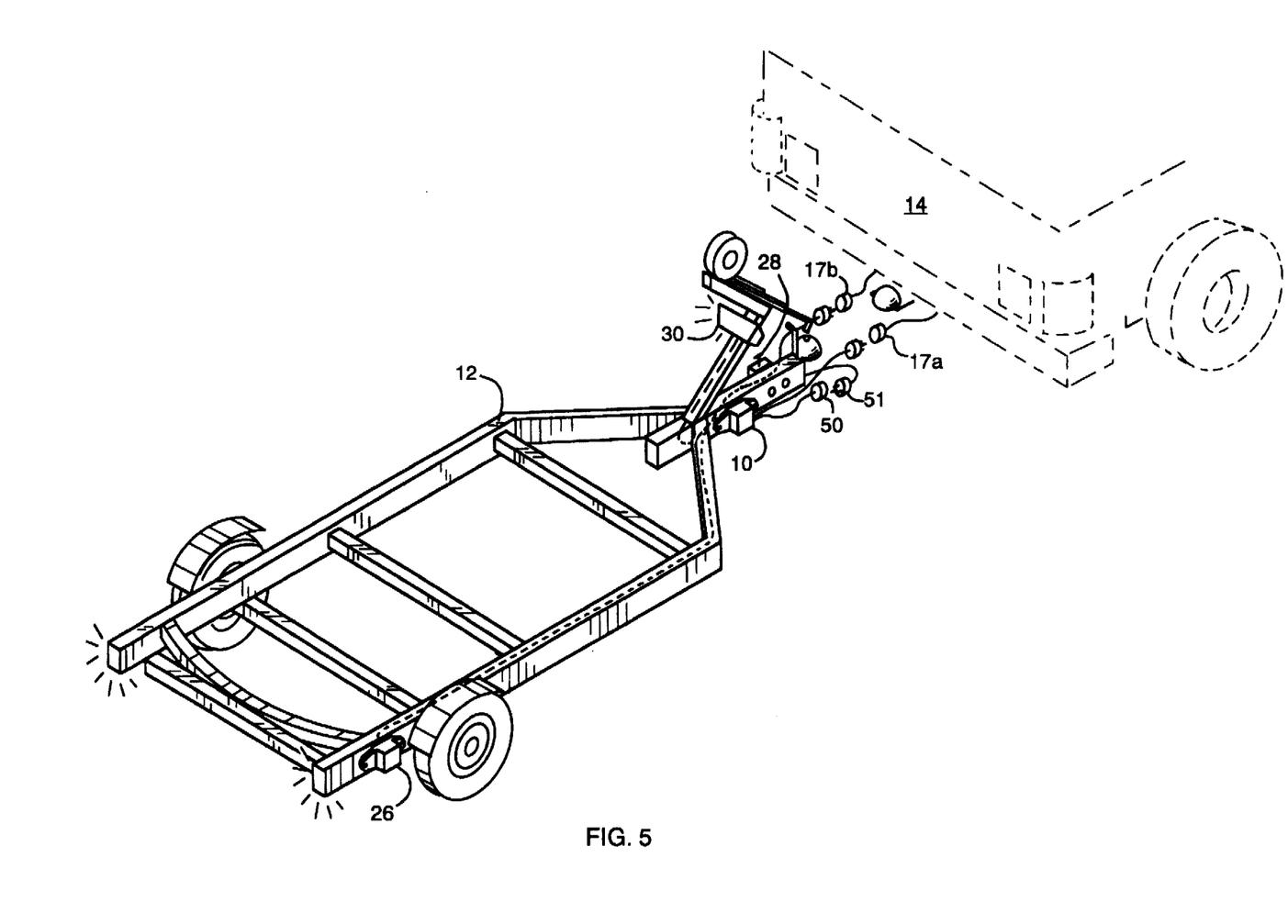
FIG. 5 is a perspective view of a vehicle and trailer equipped with an automatic trailer lighting control system according to the present invention.

The area illuminating control member 10, FIG. 5 may be mounted on the trailer 12 or alternatively on the vehicle 14 (not shown). The sensor module 26 for detecting water is mounted at an appropriate location on the trailer 12 for determining when to deactivate the power to trailer light harness 51. The manual switch 28 may be mounted at any convenient location on the trailer 12 or vehicle 14. Vehicle trailer harness 17a connects to area illuminating lighting control member 10, which then has a separate trailer harness 50 for connection to the standard trailer light harness 51. Illuminating lighting 30 may be mounted at any location on trailer 12 or on vehicle 14 for providing general illumination to the area around trailer 12. Several lighting units may be disbursed around trailer 12 for providing more lighting. Optional power harness 17b may also be employed to provide extra power for illuminating lighting 30.

Figure 6:
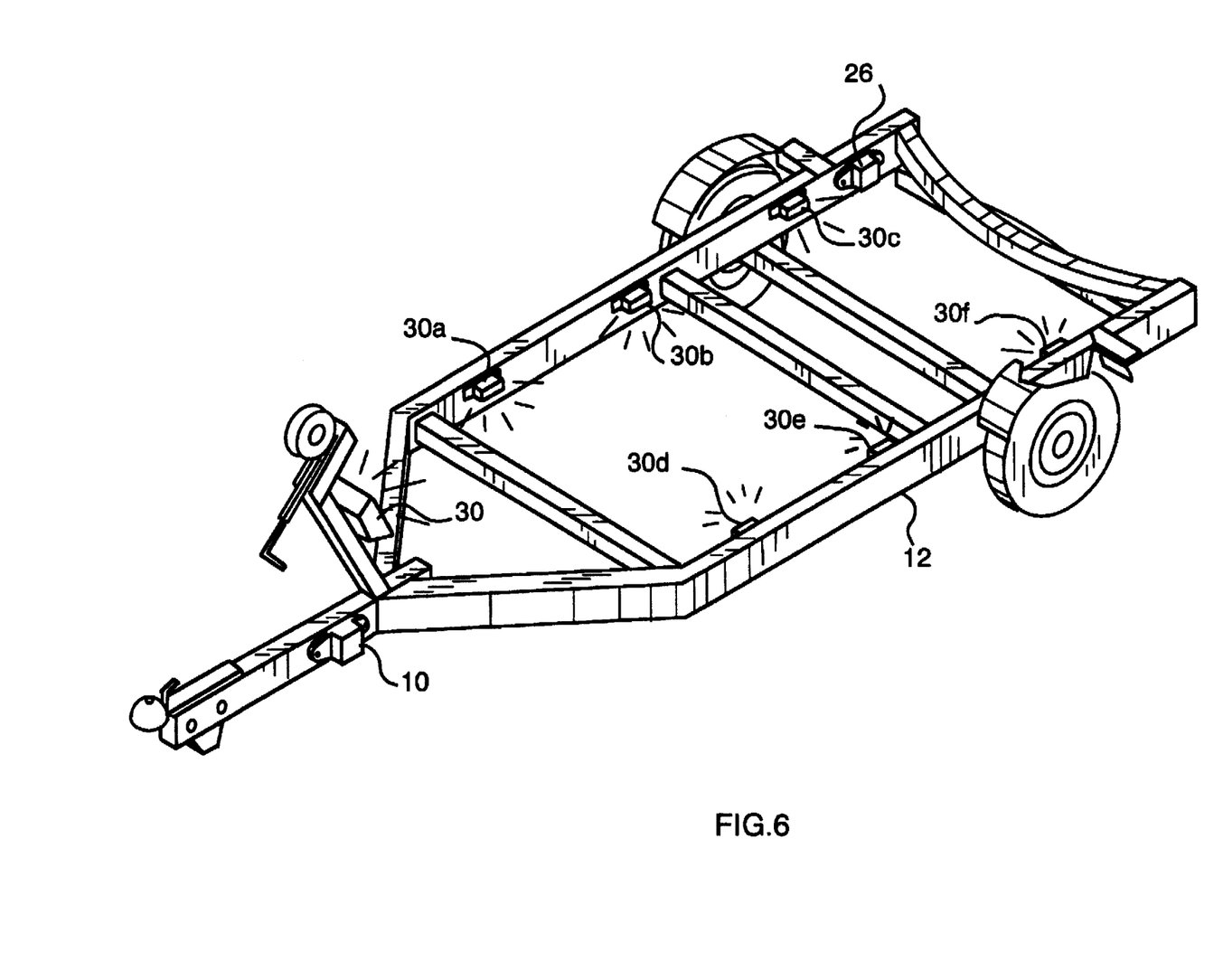
FIG. 6 is a perspective view of a trailer equipped with multiple illuminating lighting according to one embodiment of the present invention.

Multiple Illuminating lighting devices 30a–30f, FIG. 6, may be installed to provide ideal illumination around trailer 12, to supplement or replace illuminating lighting device 30.

Although an example of a boat trailer has been presented to explain the present invention, any type of trailer which requires loading and unloading of equipment will benefit from this invention. For example, a snowmobile, all terrain vehicle or motorcycle trailer could be so equipped. Further, construction companies moving construction equipment or other large vehicles on trailers could also use the lighting system disclosed by the present invention.

Accordingly, the present invention provides an easy, automatic system for providing illuminating lighting around a vehicle trailer. The small, self-contained area illuminating lighting control member 10 provides all the circuitry necessary to interpret signals from the tow vehicle 14 and automatically activates and deactivates both area illuminating lighting and trailer lighting at appropriate times. The trailer user can focus on the task at hand and not worry about setting up, plugging in and arranging auxiliary illumination while he is working.

Modifications and substitutions by one of ordinary skill in the art are considered to be within the scope of the present invention which is not to be limited except by the claims which follow.

What is claimed is:

1. A system for illuminating at least an area proximate a trailer comprising:

at least one area illuminating light, responsive to an area illuminating lighting enabling signal, for providing illuminating lighting to at least said area proximate said trailer;

an area illuminating lighting control member, coupled to said at least one area illuminating light, for energizing and de-energizing said area illuminating lighting enabling signal in response to selected ones of a plurality of trailer lighting control signals;

wherein said area illuminating lighting control member energizes said area illuminating lighting enabling signal in response to a trailer tow vehicle lights on indication signal together with at least one of a reverse lights on indication signal and a manual activation signal; and wherein said area illuminating lighting control member de-energizes said area illuminating lighting enabling signal in response to a running lights off indication signal, wherein said area illuminating lighting control member de-energizes said area illuminating lighting enabling signal in response to a reverse lights off indication signal if said area illuminating lighting enabling signal is energized in response to said reverse lights on indication signal, and wherein said area illuminating lighting control member de-energizes said area illuminating lighting enabling signal in response to at least one of a brake lights on indication signal and a turn signal on indication signal if said area illuminating lighting enabling signal is energized in response to said manual activation signal.

2. The system of claim 1 wherein said illuminating lighting control member is further responsive to at least one sensor signal, for energizing said illuminating lighting enabling signal.

3. The system of claim 2 wherein said sensor includes a water sensor.

4. The system of claim 1 wherein said manual activation signal is provided from a manual exterior switch.

5. The system of claim 1 wherein said trailer includes a boat trailer.

6. The system of claim 1 wherein said trailer includes a snowmobile trailer.

7. A system for illuminating at least an area proximate a boat trailer, said boat trailer including trailer lighting, said system comprising:

at least one area illuminating light, responsive to an area illuminating lighting enabling signal, for providing illuminating lighting to at least said area proximate said boat trailer;

an area illuminating lighting control member, coupled to said at least one area illuminating light, for energizing and de-energizing said area illuminating lighting enabling signal in response to selected ones of a plurality of trailer lighting control signals;

a water sensor, coupled to said area illuminating light control member, for providing a water sensed control signal indicating that at least a portion of said boat trailer is in contact with water, said water sensed control signal being transmitted to said area illuminating lighting control member, for disabling said trailer lighting and for energizing said area illuminating lighting enabling signal to enable said area illuminating light.

8. The system of claim 3 wherein said trailer includes trailer lighting, and wherein said area illuminating lighting control member further includes:

a trailer lighting disabling member, responsive to a trailer lighting disabling signal provided by said water sensor, for de-energizing said trailer lighting; and wherein said area illuminating lighting control member continues to energize said area illuminating lighting enabling signal to enable said area illuminating light when said trailer lighting is de-energized.

9. A method for illuminating an area around a trailer comprising:

providing at least one area illuminating light;

receiving at least a first trailer lighting control signal indicating a trailer tow vehicle "running lights on" condition;

receiving at least a second trailer lighting control signal indicating a first trailer tow vehicle predetermined condition, said at least a second trailer lighting control signal including at least one of a "reverse lights on" indication signal and a manual activation signal;

activating said at least one area illuminating light in response to said at least a first trailer lighting control signal indicating a trailer tow vehicle "running lights on" condition, and said at least a second trailer light control signal indicating a first trailer tow vehicle predetermined condition;

receiving at least a third trailer light control signal indicating a second trailer tow vehicle predetermined condition, said at least a third trailer lighting control signal including at least one of a running lights off indication signal, a reverse lights off indication signal, a brake lights on indication signal, and a turn signal on indication signal; and deactivating said at least one area illuminating light in response to:
      said running lights off indication signal;
      said reverse lights off indication signal if said area illuminating light is activated in response to said reverse lights on indication signal; and
      at least one of said brake lights on indication signal and said turn signal on indication signal if said area illuminating light is activated in response to said manual activation signal.

10. The method of claim 9 wherein said first trailer tow vehicle predetermined condition includes an indication that said trailer is in contact with water, and wherein said sensor condition signal includes a water sensed signal.

11. The method of claim 10 further including the steps of:

after the step of receiving said water sensed signal indicating that said trailer is in contact with water, the step of deactivating power to said trailer; and reactivating power to said trailer upon receiving at least a second trailer light control signal indicating that said trailer is no longer in contact with water.

* * * * *